Dec. 23, 1969 C. E. BAKER 3,485,479
ACTUATING MECHANISM FOR TELESCOPINGLY EXTENSIBLE
ELEVATING DEVICES
Filed May 31, 1967
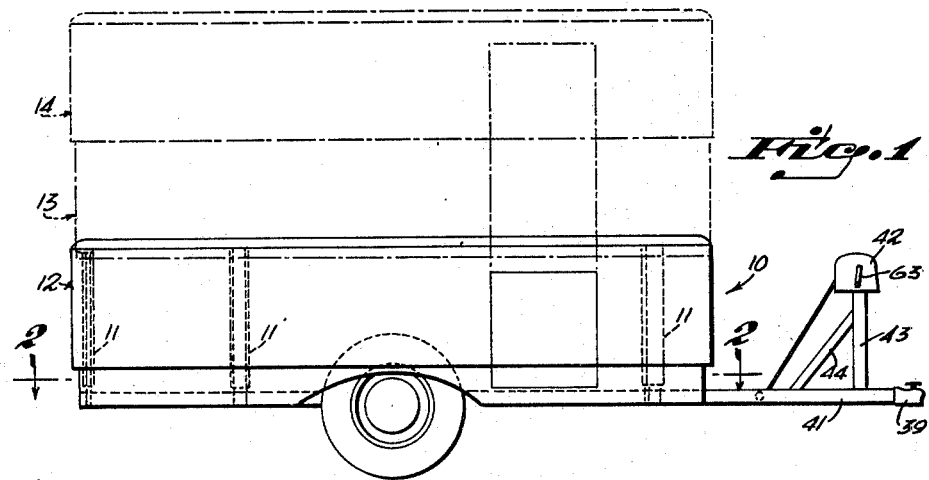
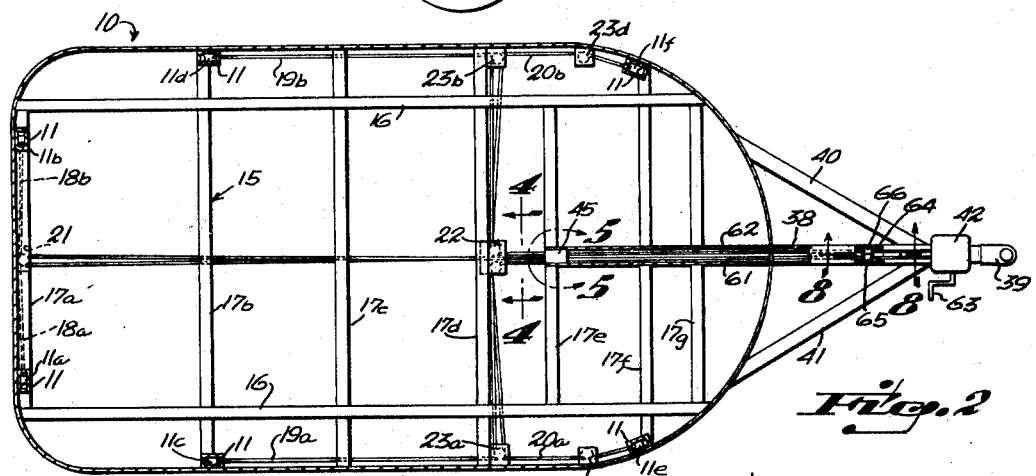
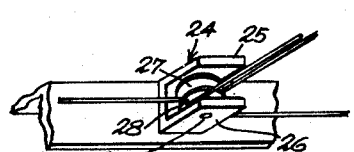
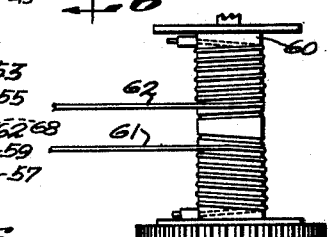
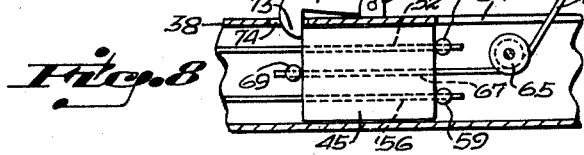
INVENTOR.
CLARENCE E. BAKER
BY E.H. Schmidt
ATTORNEY.

United States Patent Office 3,485,479
Patented Dec. 23, 1969

3,485,479
ACTUATING MECHANISM FOR TELESCOPINGLY EXTENSIBLE ELEVATING DEVICES
Clarence E. Baker, 13450 NE. 6th Ave.,
North Miami, Fla. 33161
Filed May 31, 1967, Ser. No. 642,472
Int. Cl. B66d 1/30
U.S. Cl. 254—148                                6 Claims

ABSTRACT OF THE DISCLOSURE

An actuating mechanism for operating, in unison, cable controlled, telescopingly-extensible elevating devices or jacks mounted on a common land trailer framework having a hollow, forwardly-extending hitch tongue, comprising a slide block slidable along the tongue and having connected thereto, at its rearward end, the actuating cables of the elevating devices, and at its forward end, cable means extending forwardly through the hitch tongue to terminate at a cable control winch fixed at the forward end of the tongue hitch.

---

This invention relates, generally, to actuating mechanism for telescopingly extensible elevating devices or jacks of the type used in camping trailers and the like, and is directed particularly to a simplified winch-controlled mechanism for actuating, in unison, a plurality of control cables associated with a like plurality of such elevating devices.

In my United States Patent No. 3,323,778, issued June 6, 1967, I illustrate and describe extensible elevating mechanism or jacks used in association with a collapsible land trailer for raising and lowering telescopingly interfitting sections thereof, and including a central longitudinal rod supported by the trailer framework and having, along its length, pulleys for actuation, in unison, control cables associated with the elevating mechanisms or jacks. This invention is directed, particularly, to an improved mechanism for actuating, in unison, the control cables of a plurality of cable-actuated elevating mechanisms or jacks in such a trailer framework.

The principal object of this invention is to provide, in combination with a land-travelling trailer of the character above described and including a trailer support framework and a forwardly-extending, elongated, hollow tongue member for coupling to the moving vehicle, a slide block slidably moveable within and along the tongue member and having the elevating device control cables connected at the rearward end of the slide block, and cable mechanism connected to the forward end of the slide block and extending forwardly through the tongue member to terminate externally near the forward end thereof in connection with a winch or the like for operation of the control cables in unison.

It is another object of the invention to provide a cable operating mechanism of the above nature including improved and simplified mechanism independent of the operating winch for locking the elevating mechanism in extended position, for greater safety of operation and to minimize the possibility of accidental collapse of extended trailer sections.

Yet another object of the invention is to provide a cable operating mechanism which will be simple in construction, inexpensive to manufacture, fool-proof in operation and durable in use.

Other objects features and advantages of the invention will be apparent from the following description when read with reference to the accompanying drawings.

In the drawings, wherein like reference numerals denote corresponding parts throughout the several views:

FIG. 1 illustrates a vertically-collapsible camping trailer having telescoping extensible elevating devices and embodying actuating mechanism embodying the invention, the trailer being shown in fully collapsed condition in full lines, and represented in its vertically extended position in broken lines;

FIG. 2 is a cross-sectional view of the trailer, taken along the line 2—2 of FIG. 1 in the direction of the arrows and illustrating details of the actuating mechanism;

FIG. 3 illustrates, in perspective, a typical double pulley assembly used in association with each of the elevating devices for redirecting their control cables;

FIG. 4 is a transverse cross-sectional view taken along the line 4—4 of FIG. 2 in the direction of the arrows and illustrating details of the central pulley mechanism for redirecting the various control cables as a group to the forward direction;

FIG. 5 is a top view of the inner end of the trailer tongue in the area circumscribed by the arcuate line 5—5 in FIG. 2, on an enlarged scale and with a top portion of the tongue broken away to reveal the slide block mechanism;

FIG. 6 is a vertical cross-sectional view taken along the line 6—6 of FIG. 5 in the direction of the arrows;

FIG. 7 illustrates assembly of the main slide-block-moving cables to the winding reel of a typical winch utilized for operation of the control cables; and FIG. 8 is a fragmentary cross-sectional view, taken along the line 8—8 of FIG. 2 in the direction of the arrows illustrating the lock mechanism for securing the slide block in its forward-most position to minimize the possibility of accidental release of the actuating mechanism.

Referring now in detail to the drawings, 10 in FIGS. 1 and 2 designates a collapsible trailer elevated by means of telescoping elevating units or jacks 11 controlled by actuating mechanism embodying the invention. The elevating units 11 are comprised of three or more elongated, relatively extensible sections telescopingly arranged, and including control cables for relatively extending these sections in consecutive order for elevating the upper and intermediate trailer sections 13, 14, respectively, between the collapsed and extended positions illustrated by the full-line and broken-line representations thereof in FIG. 1.

As illustrated in FIGS. 1 and 2, the relatively extensible trailer sections 12, 13 and 14, of the trailer 10 are supported by a rectangular framework 15 of longitudinal channel members 16, secured in spaced relation, such as by welding, by a plurality of transverse members 17a through 17g, intermittently spaced from end to end along said channel members. The rear pair of elevating units comprise lower end pulleys 11a, 11b over which their associated control cables 18a, 18b are directed to approach laterally towards the center of the trailer, where they are redirected by passage through a rear pulley assembly 21 to extend forwardly for passage through a main pulley assembly 22 fixed with respect to transverse channel member 17d near the forward end of the trailer framework, as is hereinbelow more particularly described. The elevating units 11 in the opposed side walls near the rear end of the trailer comprise control cables 19a, 19b, directed over pulleys 11c, 11d, respectively of said elevating units to extend forwardly at each side of the framework to be redirected inwardly from each side by side pulley assemblies 23a and 23b, respectively. The pulley assemblies 23a, 23b also redirect cables 20a, 20b extending over lower end pulleys 11e, 11f, of the elevating units 11 at each side near the front of the trailer framework and guided over intermediate pulleys 23c, 23d. It will be noted that the side pulley assemblies 23a, 23b, are positioned in lateral alignment with the main pulley assembly 22 so that their associated cables can be redirected in the direction of said main pulley assembly substantially at right angles thereto.

FIG. 3 illustrates constructional details of the rear pulley assembly 21 and the side pulley assemblies 23a, 23b, which, by way of example, may comprise a U-shaped bracket 24 having upper and lower support plates 25, 26 respectively, received between which are upper and lower pulley wheels 27, 28, respectively, journalled on a vertical axle pin 24a.

Referring now to FIG. 4, it will be seen that the main pulley assembly 22 comprises a U-shaped bracket 29, having upper and lower plates 30 and 31, respectively, open toward the front of the trailer framework. As illustrated in FIG. 2, the main pulley assembly 22 is fixed, as by welding, at a central position along the transverse channel member 17d near the forward end of the trailer framework. Vertically journalled between the upper and lower plates 30 and 31 of the U-shaped bracket 29, is a first pair of upper and lower pulley wheels 32, 33, respectively, carried on an axle pin 36. Similarly arranged at the other side of the U-shaped bracket 29, is a second pair of upper and lower pulleys 34, 35 carried by an axle pin 36.

Fixed as by welding to the forward transverse channel members 17e, 17f and 17g, and extending forwardly beyond the front of the rectangular trailer framework 15, is a central, longitudinally-extending trailer tongue 38 which is preferably of steel in the form of a square tube. The outer end of the trailer tongue 38 has fixed thereto a trailer hitch coupling member for attachment to the transporting vehicle. Convergent lateral support members 40, 41 extending between the forward end of the trailer framework and an outer end portion of the tongue 38 add strength and rigidity to the tongue assembly.

Means is provided for pulling the elevating mechanism control cables 18a, 18b; 19a, 19b and 20a, 20b, in unison so as to raise the intermediate and upper trailer sections 13 and 14 easily and evenly. To this end, a cable winding winch 42 supported atop a vertical post 43 fixed at its lower end near the outer end of the trailer hitch 39, is provided. A strut bar 44 welded at an angle between the vertical post 43, near the upper end thereof, and the trailer tongue 38 at a position somewhat to the rear of said vertical post provides additional rigidity for the winch assembly. Slidably arranged within the tubular trailer tongue 38 is a slide block 45, also preferably of steel (see FIGS. 2, 5 and 6). As illustrated in FIGS. 2, 4, 5 and 6, the forwardly-extending elevating mechanism control cables 18a, 18b associated with the rear elevating units or jacks 11 pass through vertically-aligned openings 46, 47 extending through the transverse channel member 17d and the web portion of the main pulley assembly U-shaped bracket and thence through a pair of central, vertically spaced openings 48, 49, in the slide block 45. Cinch type spherical stop members 50, 51, applied to the forwardly projecting ends of the cables 18a, 18b prevent their withdrawal from said slide block. The intermediate cables 19a, 19b, which, as hereinabove described, are directed centrally from each side, pass around opposed upper pulleys 36, 34, respectively, of the main pulley assembly 22, whereat they are redirected forwardly to pass through a pair of laterally-spaced openings 52, 53 in the slide block 45 near the upper end thereof. Withdrawal of the cables 19a, 19b, from the slide block 45 is prevented, similarly, by the use of cinch type stop members 54, 55. In a like manner, the front cables 20a, 20b, extend around the lower pulleys 33, 35 of the main pulley assembly 22, and thence through a pair of horizontally-spaced openings 56, 57 near the lower end of the slide block 45, whereat they are fixed against withdrawal by cinch type stop members 58, 59.

As a means for pulling the slide block 45 forwardly within the trailer tongue 38, the cable-winding winch 42 has secured to its winding spool 60 (see FIG. 7), a pair of cables 61, 62 operative to be wound or released in unison upon turning of the usual winch-operating hand crank 63 (see FIG. 2). As illustrated in FIGS. 1 and 2, the winch cables 61, 62, extend down through a rectangular opening 64 in the top wall of the trailer tongue 38 and around a pair of horizontally-spaced pulleys 65, 66 journalled between side wall portions of said trailer tongue, and thence rearwardly through the interior opening of said tongue and through a pair of horizontally-spaced, central openings 67, 68 in the slide block 45. The winch cables 61, 62 extend just beyond the rear end of the slide block 45 and are secured thereat to prevent forward withdrawal by the use of cinch stop members 69, 70 (see FIG. 5).

In operation, turning of the winch-operating hand crank 63 (see FIGS. 2 and 7), in the clockwise direction will, in winding the cables 61, 62 on the winding spool 60 as described above, pull the slide block 45 forwardly in the trailer tongue 38. The slide block 45, in turn, will pull along central cables 18a, 18b; 19a, 19b and 20a, 20b, in unison, whereby their associated elevating mechanisms or jacks 11 will also be actuated in unison to raise the trailer sections 13 and 14 smoothly and evenly. The usual ratchet and pawl mechanism in the winch (not illustrated), will ordinarily prevent accidental retrograde movement of the winch winding spool while the elevating operation is taking place and after elevation is completed. For increased safety, however, I provide means independent of the winch for securing the elevating mechanism in extended position. To this end, as illustrated in FIGS. 2 and 8, I provide, just forward of the rectangular opening 64 in the top wall of the trailer tongue 38, a hook lever 71 having a rearwardly-extending arm portion 72 terminating in a downwardly-extending hook end portion moveable down into a slot 73 provided in said top wall. The hook lever 71 is formed with a rearwardly and upwardly-extending control handle portion 75, and is pivotally mounted on a fulcrum pin 76 journalled in a bracket 77 secured to the top wall of the trailer tongue. As illustrated in FIG. 8, the hook lever 71 is operative to fall behind the slide block 45 when in its forward-most position (the fully elevated position) and thereby prevent rearward movement of said block independently of whether or not tension is maintained on the winch cables 61, 62. It will thus be apparent that failure of the winch cables or winch mechanism, or accidental release of the winch locking mechanism when in fully wound condition, will not result in collapse of the controlled elevating mechanisms. It is further to be noted that the outside of the hook end of the rearwardly-extending arm portion 72 of the hook lever 71 is rounded, to present a smooth, curved edge to the slide block 45 as it moves forwardly in the trailer tongue, whereby said lever will be automatically raised by cam action as said slide block moves to the terminal position illustrated in FIG. 3. It will be understood that as soon as the slide block moves beyond the hook end portion of the hook lever 71, said lever will fall by gravity into the locking position, from which it can readily be manually released by pushing down on its control handle portion 75.

While I have illustrated and described herein only one form in which my invention can be embodied in practice, it is to be understood that this form is presented by way of example only, and not in a limiting sense.

What I claim as new and desire to secure by Letters Patent is:

1. In actuating mechanism for operating, in unison, a plurality of cable-controlled elevating jacks mounted on a common land trailer framework having a tubular, forwardly-extending hitch tongue, the combination comprising, a slide block member being of the same configuration of said tubular hitch tongue slidably arranged within the interior of said tongue, pulley means directing the outer ends of the jack control cables to the rear of said slide block member in the direction of sliding movement thereof, said outer ends of said cables extending through the rear end of said hitch tongue and being fixed with respect to said slide block, a winch mounted at the outer end of said tongue, and cable means secured to and extending through the interior of said tongue and tied between said slide block and said winch for pulling said slide block and its associated control cables forwardly in said slide block.

2. An actuating mechanism as defined in claim 1 wherein said cable means comprises a cable fixed to said slide block and extending through a slide opening near the front end of said tongue, said winch being secured in laterally spaced relation with respect to said tongue.

3. An actuating mechanism as defined in claim 1 including hook means for retaining said slide block in its forward-most position in said tongue as pulled thereto by said winch.

4. An actuating mechanism as defined in claim 1 wherein said pulley means comprises pulley assemblies secured to the trailer framework and having rotatably mounted pulley wheels over which the jack control cables are guided.

5. In actuating mechanism for operating, in unison, a plurality of cable-controlled elevating jacks mounted on a common land trailer framework having a hollow, forwardly-extending hitch tongue, the combination comprising, a slide block member slidably arranged within the interior of said tongue, pulley means directing the outer ends of the jack control cables to the rear of said slide block member in the direction of sliding movement thereof, said outer ends of said cables being fixed with respect to said slide block, a winch mounted at the outer end of said tongue, cable means secured to and extending through the interior of said tongue and secured between said slide block and said winch for pulling said slide block and its associated cables forwardly in said slide block, and hook means for retaining said slide block in its forward-most position in said tongue as pulled thereto by said winch, said hook means comprising a hook lever pivotally journalled with respect to the outside of said tongue and having a rearwardly-extending hook end portion movable through a slot in the side of said tongue rearwardly of said side opening and hookingly engageable with the rear end of said slide block when in its forward-most position.

6. An actuating mechanism as defined in claim 5 wherein said hook means further comprises a rounded cam edge formed at the outside of said lever hook end portion and operative to be raised by the engagement therewith of the front end of said slide block as it moves forwardly to its forward-most position, thereafter to fall under the force of gravity into locking position behind said slide block.

References Cited

UNITED STATES PATENTS

| | | | |
|---|---|---|---|
| 1,251,149 | 12/1917 | White | 254—144 |
| 1,657,670 | 1/1928 | Fitch | 254—144 |
| 2,278,817 | 4/1942 | Zeindler | 254—148 |
| 2,767,013 | 10/1956 | Spears | 296—23.3 |

HARVEY C. HORNSBY, Primary Examiner

U.S. Cl. X.R.

296—27